United States Patent [19]

Rogers, Jr.

[11] E Patent Number: Re. 33,704

[45] Reissued Date of Patent: Oct. 1, 1991

[54] ROCKER-RECLINER CHAIR

[75] Inventor: Walter C. Rogers, Jr., Denton, N.C.

[73] Assignee: Parma Corporation, Denton, N.C.

[21] Appl. No.: 380,522

[22] Filed: Jul. 17, 1989

Related U.S. Patent Documents

Reissue of:

[64] Patent No.: 4,519,647
Issued: May 28, 1985
Appl. No.: 457,181
Filed: Jan. 11, 1983

U.S. Applications:

[63] Continuation-in-part of Ser. No. 292,700, Aug. 13, 1981, Pat. No. 4,418,957, which is a continuation-in-part of Ser. No. 199,595, Oct. 22, 1980, Pat. No. 4,350,387.

[51] Int. Cl.[5] ..... A47C 1/02

[52] U.S. Cl. ..... 297/85; 297/271; 297/DIG. 7

[58] Field of Search ..... 297/85-88, 297/261, 271, DIG. 7

[56] References Cited

U.S. PATENT DOCUMENTS

| | | | |
|---|---|---|---|
| 3,243,226 | 3/1966 | Katz | 297/85 |
| 3,493,264 | 2/1970 | Ré | 297/DIG. 7 |
| 4,437,701 | 3/1984 | Mizelle | 297/DIG. 7 |

FOREIGN PATENT DOCUMENTS

| | | | |
|---|---|---|---|
| 1427591 | 3/1976 | United Kingdom | 297/DIG. 7 |

*Primary Examiner*—Peter R. Brown
*Attorney, Agent, or Firm*—William E. Mouzavires

[57] ABSTRACT

A rocker-recliner chair including a base, rocker cams mounted on the base, a unitary seat and armrest assembly mounted on the rocker cams by a novel linkage system for movement between a closed or generally upright position with the associated footrest closed, a TV position wherein the footrest has been extended and the seat inclined relative to the rocker cam, and any one of a number of advanced reclining positions where the footrest remains extended and the backrest has moved relative to the seat while the seat has moved relative to the rocker cam. When the chair is in the TV or any advanced reclining position, a "rock-blocking" mechanism prevents forward-rearward rocking of the cams relative to the base, however, the cams are permitted to rock rearwardly to permit movement of the seat into advanced reclining positions. In the preferred embodiment, actuation of the footrest to the TV position is initiated by means of a handle positioned on one side of the chair. This opens a release mechanism to allow the chair to be moved to TV position through the weight of the occupant of the chair.

20 Claims, 3 Drawing Sheets

ROCKER-RECLINER CHAIR

Matter enclosed in heavy brackets [ ] appears in the original patent but forms no part of this reissue specification; matter printed in italics indicates the additions made by reissue.

*RELATED APPLICATIONS*

*The present application is a continuation-in-part of my prior copending application Ser. No. 292,700, filed Aug. 13, 1981, now U.S. Pat. No. 4,418,957, entitled Recliner Chair With Improved Actuation which, in turn, is a continuation-in-part of U.S. application Ser. No. 199,595, filed Oct. 22, 1980, entitled Recliner Chair With Improved Actuation, now U.S. Pat. No. 4,350,387. The present application is also related to U.S. patent application Ser. No. 264,144, filed May 15, 1981, now U.S. Pat. No. 4,350,386, entitled Recliner Chair With Improved Actuation which, in turn, is another continuation-in-part of U.S. application Ser. No. 199,595, now U.S. Pat. No. 4,350,387 identified above.*

BACKGROUND OF INVENTION

Rocker-recliner chairs are of course old in the prior art as a general category of chair. One type of rocker-recliner that has been in use for many years basically consists of a standard recliner chair whose armrests are mounted on rocker cams to provide the desired rocking movement. The seat is mounted to the armrests for movement relative to the armrest when the chair is moved to TV position which movement is effected by pushing off the armrests to exert pressure on the backrest which pivots rearwardly relative to the seat while the seat moves rearwardly relative to the armrests. This movement of the seat is achieved through a linkage mechanism mounting the seat to the armrests to provide a certain amount of translational movement of the seat relative to the armrests in the rearward direction of the chair. While these chairs have certainly gained acceptance in the industry, they are limited in the respect that they cannot accommodate a T-cushion styling because the seat is mounted to move relative to the armrests. Additionally, the chair consumes a large space because of the mounting of the armrests on the rocker cams and because of the translational movement of the seat relative to the armrests when moving into reclining positions. Moreover, the chair is susceptible to lurching rearwardly when the footrest is extended to place the chair in TV position. To overcome this possibility, it is necessary to add some means to overcome or inhibit the tendency of the chair to lurch.

Other types of rocker recliners have been developed with the object of reducing the space requirements of the chairs of the type described above. In these chairs, the seat and backrest do not move relative to the rocker cams when the footrest is extended to place the chair in TV position. While these chairs allowed T-cushion styling and reduced the space requirements of the chair, they created a forward-lurching problem because the seat did not move relative to the cams to compensate for lurching when the footrest was extended. In a more recent rocker-recliner of my invention disclosed in U.S. Pat. No. 4,319,780, issued Mar. 16, 1982, a "wall-avoiding" mechanism is provided by a seat which moves forwardly relative to the rocker-cam linkage in going to TV position. However, this enhances the tendency of the chair to lurch forwardly when moving to TV position.

OBJECTS OF THE PRESENT INVENTION

It is an object of the present invention to provide a novel rocker-recliner chair that reduces the space requirements for the chair while at the same time avoiding the tendency of the chair to lurch forward when the footrest is extended. Including herein is the provision of such a rocker-recliner chair that may also be designed to accommodate T-cushion styling if desired.

Another object of the present invention is to provide a novel and improved linkage system for a rocker-recliner chair.

Another object of the present invention is to provide a novel and improved rocker-recliner chair.

A further object of the present invention is to provide a rocker-recliner chair that may be moved to its various reclining positions through the weight of the occupant of the chair.

A still further object of the present invention is to provide such a recliner chair that will achieve the above objects and yet may be commercially manufactured to be competitive with existing rocker-recliner chairs.

SUMMARY OF INVENTION

In summary, a preferred embodiment of the invention includes a base, a rocker cam assembly mounted on the base, and a unified seat and armrest structure mounted on the rocker cam assembly to be rotatable downwardly relative to the rocker cam assembly about a fixed axis, preferably at the forward end of the seat, in order to place the chair in TV position with the footrest extended. A novel linkage mounts the rear end of the seat to the rocker cam assembly such that the weight of the chair occupant tends to move the chair to TV position. However, a release mechanism, controlled by a manual handle on one side of the chair, prevents the seat from moving relative to the rocker cam to TV position when the chair is in the generally normal upright position (closed position) for rocking. Once the release mechanism is opened by means of the handle, the chair will automatically move to TV position to extend the footrest while the rear end of the seat rotates downwardly towards the rocker cam assembly about its aforementioned pivotal connection to the latter. This motion of the seat is transmitted to the footrest linkage by means of a linkage to extend the footrest.

When moved into the TV position, a novel "rock-blocking" mechanism becomes effective to prevent forward-rearward rocking of the chair.

The backrest is pivotally mounted to the seat and is pivotally connected to the rocker cam assembly so that it is prevented from moving relative to the seat and the rocker cam assembly when the chair is in the closed or normal, generally upright position. However, once the chair is moved to TV position, the backrest is freed, and the chair may be placed into advanced reclining positions by exerting pressure on the backrest which causes the seat to rotate upwardly about its aforementioned pivot to the rocker cam assembly and this motion is transmitted to the rock-blocking mechanism to raise the front end of the rocker-cam assembly causing the latter to rock rearwardly on the base. The chair may be returned to TV position by relieving pressure on the backrest. Thereafter, the chair may be returned from TV to closed position by exerting downward leg pressure on the footrest to fold the same into its retracted position.

The release mechanism then becomes effective to retain the chair in the closed position where it may be used as a conventional rocker. If desired, an overcenter spring biasing mechanism may be employed to yieldingly restrain the release mechanism in its locking position.

DRAWINGS

Other objects and advantages of the present invention will become apparent from the following more detailed description taken in conjunction with the attached drawings in which.

DETAILED DESCRIPTION

Figure 1:
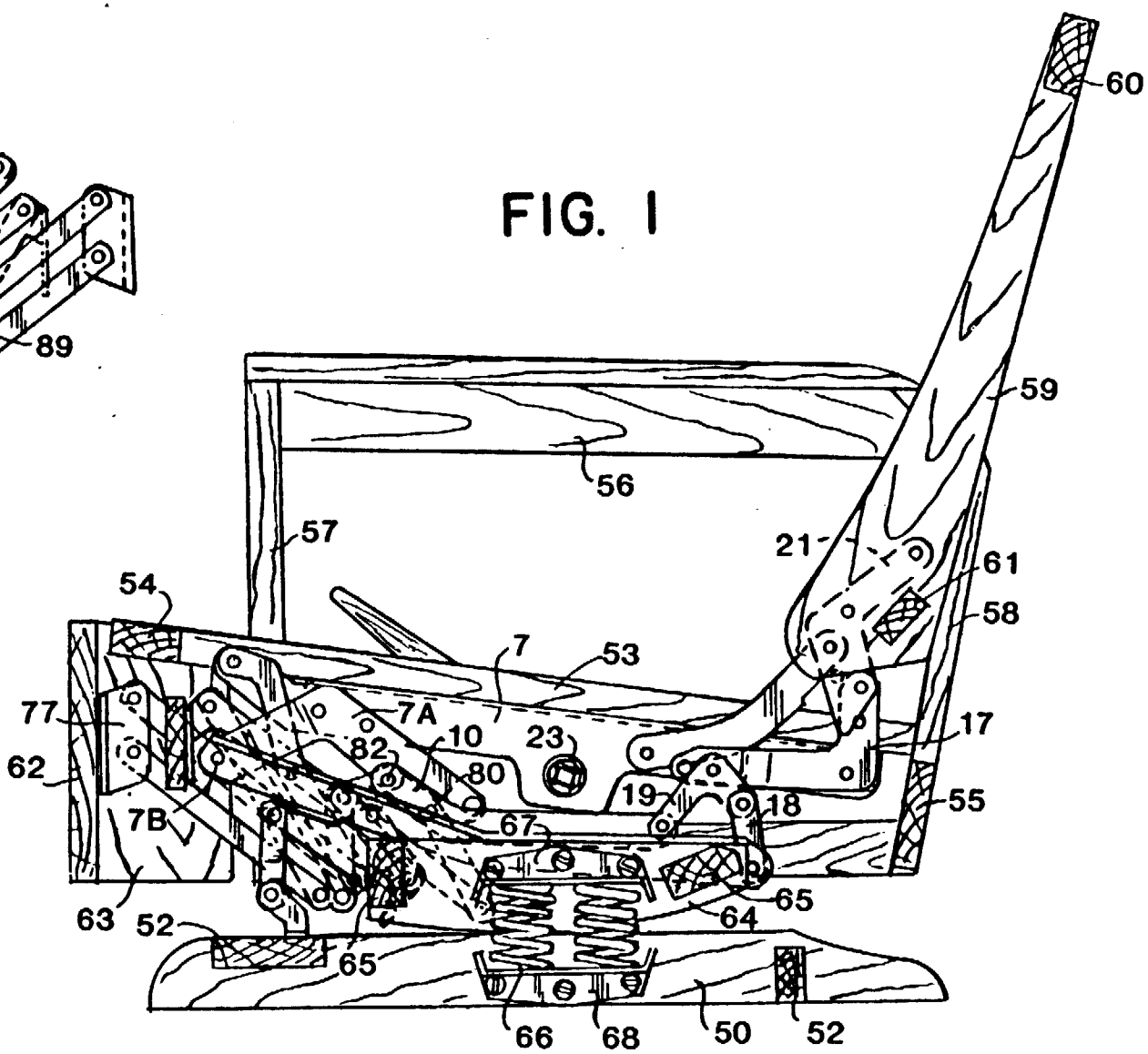
FIG. 1 is a side-elevational view of one preferred embodiment of the rocker-recliner chair of the present invention shown in the closed or generally upright position and with the upholstery being removed in order to show internal parts.

Referring now to the drawings in detail, there is illustrated one preferred embodiment of a rocker-recliner chair embodying the present invention. Referring first to FIG. 1, the chair includes a base including a pair of side rails 50 extending in the forward-rearward direction of the chair and joined by cross rails 52. The chair further includes a unitary seat and armrest frame, the seat frame including side rails 53 interconnected by a front cross rail 54 and a rear cross rail 55; and the armrest frame including side rails 56 and vertical front and rear posts 57 and 58 respectively fixed to the seat frame to form a one piece structure in effect. The chair further includes a backrest frame including vertical side pieces interconnected by upper and lower cross pieces 60 and 61 respectively. At the front of the chair is a footrest frame including a front piece 62 and side pieces 63 fixed to the front piece 62. All of the frame elements described thus far may be made from any suitable material such as wood as shown. Additionally, the chair will include upholstery and cushions (not shown); the seat cushion in the shown embodiment being a T-cushion accommodated by the recessed positioning of the armrests.

Mounted on the base for rocking movement are a pair of rocker cams 64 joined by cross pieces 65. Rocker springs 66 are typically interposed between the rocker cams 64 and the base 50 between brackets 67 and 68 fixed to the latter elements respectively in conventional fashion.

Figure 7:
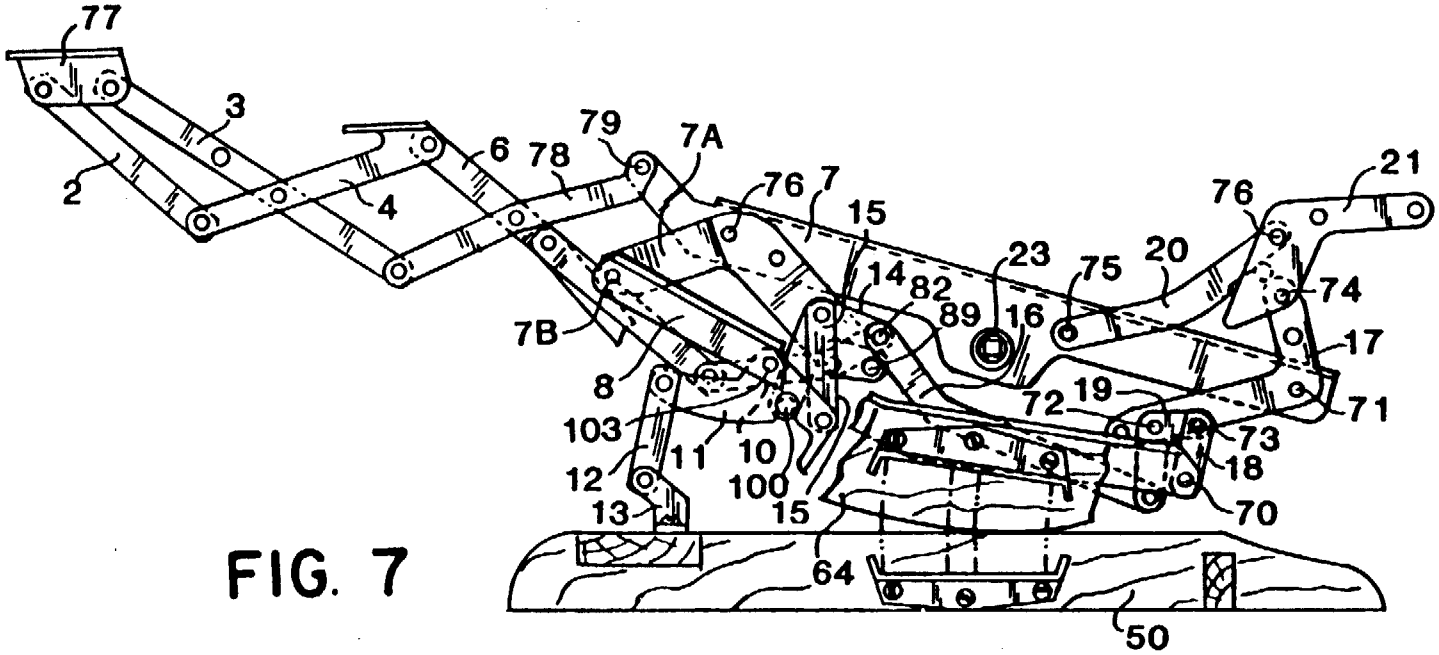
FIG. 7 is a view generally similar to FIG. 3 except that the chair is shown as having been moved to the fully advanced or fully reclined position.

Referring now to FIGS. 1 and 7 together, the seat is mounted to the rocker cams 64 by a linkage system on opposite sides of the chair, each including an elongated seat rail 7 fixed to the side rail 53 of the seat and extending in the forward-rearward direction of the chair. Seat link 7 includes a front portion 7A rigidly fixed thereto at 7C. Pivotally connected to the front end of the latter by pivot 7B is an elongated cam link 8 fixed to the cam 64 to extend in the forward-rearward direction of the chair below the seat link. At the rear of the chair, seat link 7 is pivotally mounted on the cam link 8 by means of a backrest mounting link 17, a bell crank link 19 and a short mounting link 18, the latter being pivotally mounted at 70 to the rear end of cam link 8. Backrest mounting link 17 is pivotally mounted at 71 to the rear end of seat link 7 while bell crank link 19 is pivotally mounted at its bite by pivot 72 to link 17, one end of bell crank link 19 is pivotally connected at 73 to mounting link 18.

The backrest frame 59 is mounted to the seat by a backrest link 21 fixed to backrest frame 59 and pivotally connected at 74 to the upper cranked portion of backrest mounting link 17. Additionally, the backrest link 21 is mounted to seat link 7 by means of another backrest mounting link 20 pivotally interconnected between the two by pivots 75, 76 forwardly of the other mounting link 17.

Figure 3:
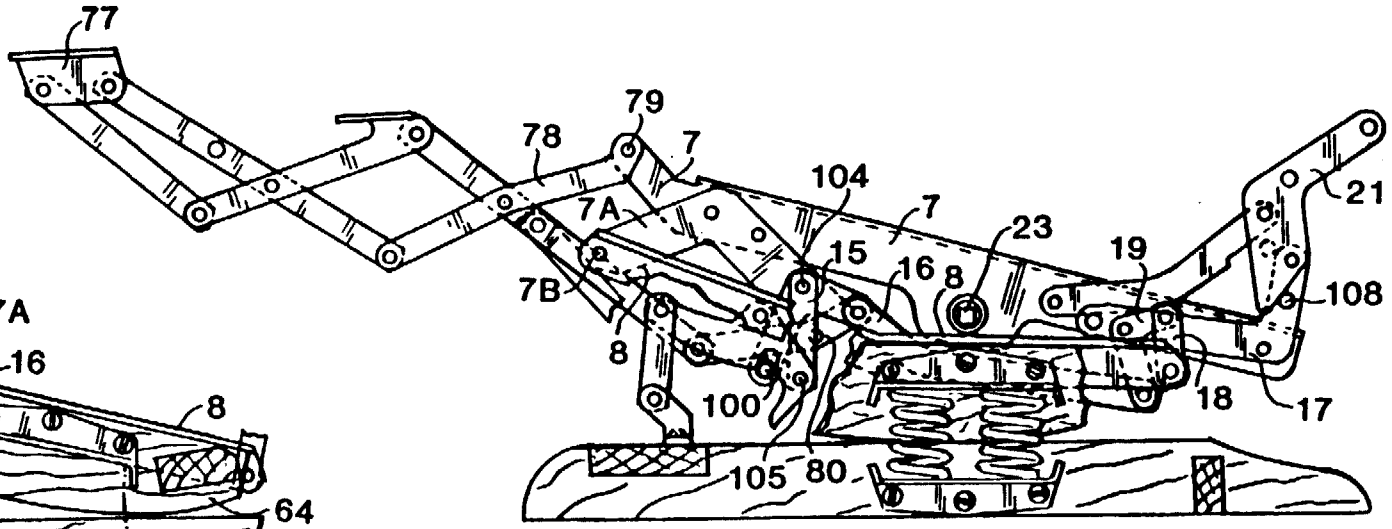
FIG. 3 is a view generally similar to FIG. 1 except that the chair is shown in the TV position and with certain frame parts of the chair removed.

Referring now to FIG. 3, the footrest 62 (see FIG. 1) is mounted to the seat by a footrest linkage for movement between a closed position wherein the footrest 62 extends vertically below the front of the seat as shown in FIG. 1 and an open position wherein the footrest 62 is projected forwardly of the seat and lies in a generally horizontal position as best illustrated by the footrest bracket 77 as seen in FIG. 3 which bracket is fixed to the footrest 62 as shown in FIG. 1. The footrest linkage includes a front footrest mounting link 78 pivotally mounted at pivot 79 to the forward end of seat link 7; and a rear footrest mounting link 10 pivotally mounted to seat link 7A by pivot 80 (see FIG. 1).

Figure 2:
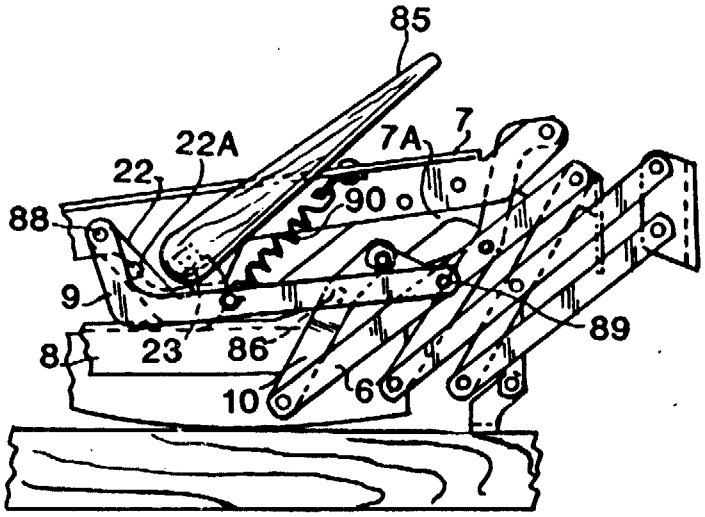
FIG. 2 is a fragmental, side-elevational view illustrating the footrest mechanism and its associated actuating means when in the closed position.

Referring to FIG. 7, front footrest mounting link 78 is pivotally connected at its intermediate portion to a link 6 which has its rear end pivotally connected to rear footrest mounting link 10. Generally parallel to link 78 is a link 4 which is pivotally connected to link 6 and a link 3 whose rear end is pivotally connected to link 78. Generally parallel to link 3 is a link 2 which has its rear end pivotally connected to link 4. Links 2 and 3 are pivotally connected to footrest bracket 77. The footrest linkage per se is thus a conventional lazy-tong type linkage which needs no further elaboration except to note that is extended position is shown in FIG. 7 while its retracted position is best shown in FIG. 2.

In the preferred embodiment of the chair shown in the drawings, the seat is actuated from the closed position of FIG. 1 to TV position shown in FIG. 3 through the weight of the chair occupant. When the chair is in closed position (FIG. 1) the weight of the chair occupant exerts downward forces on the bell crank link 19 through the backrest mounting link 17 at the rear of the seat linkage. However, a draw bar link 16 pivotally connected at its rear end to one of the arms of the bell crank link 19, prevents any movement of the latter and in turn any movement of the seat relative to the cam link 8. Draw bar link 16 is elongated, extending in the forward-rearward direction of the chair and is pivotally connected at its forward end by pivot 82 to the rear footrest mounting link 10, see FIGS. 1 and 7. When the chair is in the closed position with the footrest fully retracted as shown in FIG. 1, the rear footrest mounting link 10 retains the draw bar 16 against movement by the weight of the chair occupant acting through bell crank link 19 as described above. The rear footrest mounting link 10 in turn is retained in its retracted position by means of a release mechanism in the form of links 9 and 22 shown in FIG. 2. Link 9 is pivotally connected at its forward position 86 and 87 to footrest links 10 and 6 and at its rear end 88 to one end of link 22. The opposite end of link 22 is rigidly fixed to a shaft 23 mounted in the seat link 7 (see FIGS. 1, 3 or 7). Rigidly fixed to shaft 23 is a handle 85. In the closed position of the chair and footrest, the pivots 87 and 88 are on center with the shaft 23 and are retained in this position by a tension spring 90. Thus, the footrest mounting link 10 together with the remainder of the footrest linkage are retained in closed position. Additionally, this also has the effect of preventing movement of the draw bar 16 which is under the gravity force of the occupant's weight acting through links 17 and 19 at the rear of the chair as described above. The seat is thus retained against movement relative to the cam link 8 and, of course, the rocker cam 64 which is mounted to the latter.

In order to place the chair in the TV position shown in FIG. 3 from the closed position shown in FIG. 1, it is necessary to release the draw bar 16 from the holding effect of footrest mounting link 10 and the release mechanism, links 9 and 22. This is easily and effortlessly accomplished by the chair occupant grasping handle 85 and rotating it counterclockwise as viewed in FIG. 2 to move the pivots 87 and 88 off center with respect to the shaft 23 and against the bias of springs 90. Once this occurs, draw bar 16 will be released and the weight of the chair occupant acting through links 17, 19 and 16 will cause the seat link 7 to rotate downwardly (clockwise in FIG. 1) about pivot 7B and to cam link 8 (at the front of the chair) while the crank link 19 moves downwardly (pivoting relative to link 18) with the rear of the seat link 7. During the above described movement, the draw bar 16, under the force of gravity from the occupant's weight acting through bell crank link 19, will rotate the rear footrest mounting link 10 (clockwise in FIG. 1 about its pivot 80 to seat link 7A) to thus unfold the footrest linkage into its extended position of FIG. 3. This position is limited and positively determined by a stop pin 89 fixed on the lower end of seat link 7A which pin 89 engages the lower edge of footrest mounting link 10 as best seen in FIG. 7.

Figure 8:
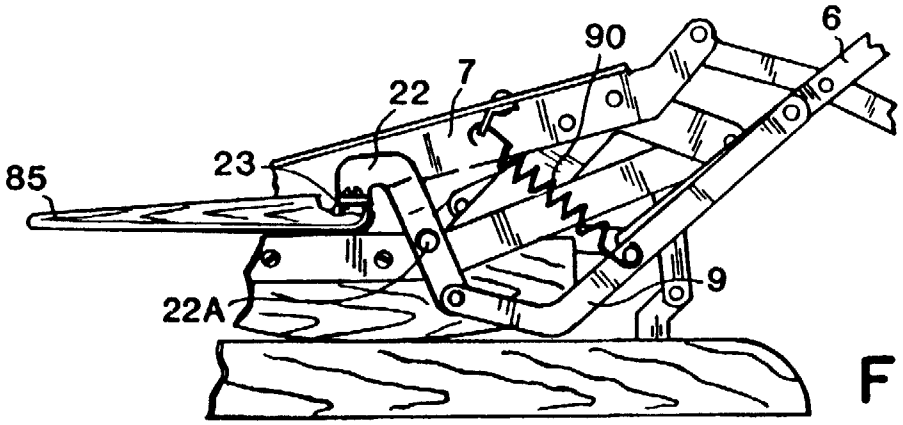
FIG. 8 is a view mainly corresponding to FIG. 2 except that it shows the parts in the position when the chair has been moved to the TV position.

FIG. 8 shows the position of handle 85, release links 9 and 22 and biasing spring 90 when the chair has been moved to the TV position of FIG. 3. Note that spring 90 which is secured at its opposite ends to seat link 7 and release link 9, has moved past center from its position of FIG. 2, and now exerts a biasing force tending to maintain the footrest in the extended position. In order to return the chair and footrest to the closed position of FIGS. 1 and 2 from the TV position of FIG. 3, the chair occupant need only exert downward pressure with his legs on the footrest 62 to fold it closed. During the latter closing movement of the footrest linkage, once the spring 90 moves past its center (its point of fixation to seat link 7) it will snap the release links into their closed, restraining position of FIG. 2 to thus in effect lock the linkage system into the closed position of FIG. 1. This closed position of release links 9 and 22 is positively determined by a stop 22A fixed to release link 22 to engage the edge of release link 9 as shown on FIG. 2.

Figure 5:
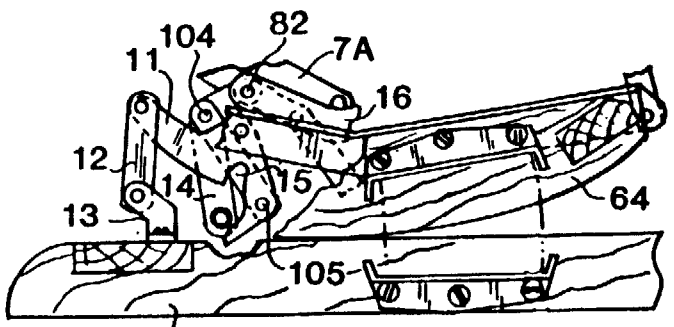
FIG. 5 is a view generally similar to FIG. 4 except showing the parts when the chair has been rocked forwardly.
Figure 4:
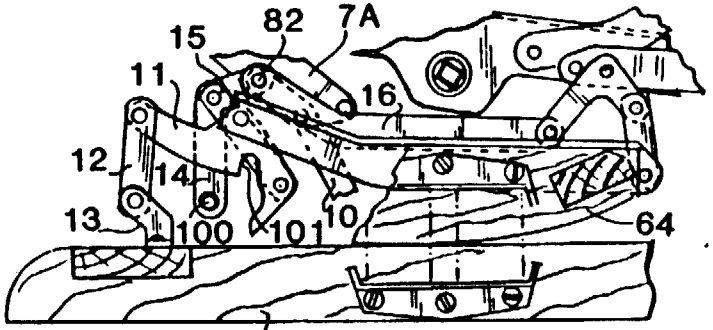
FIG. 4 is a fragmental, side-elevational view of portions of the chair and its associated linkage for blocking and restraining rocking movement of the chair.
Figure 6:
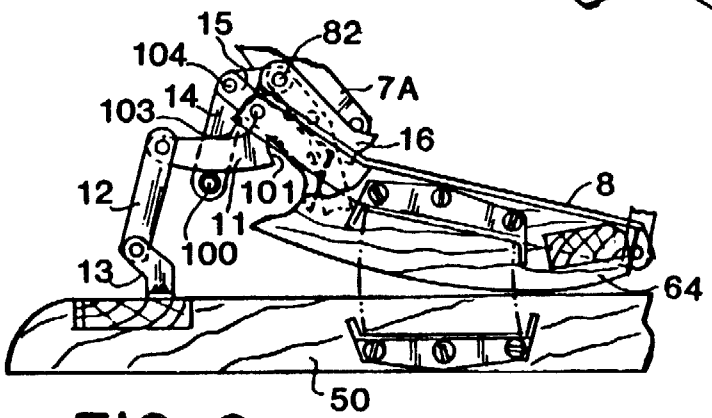
FIG. 6 is a view generally similar to FIG. 4 except showing the parts when the chair has been rocked rearwardly.

Referring now to FIGS. 4, 5 and 6, when the chair is in the closed position of FIG. 1, the rocker cam 64 will be free to rock forwardly and rearwardly on base 50 during which time the seat remains fixed against movement relative to the rocker cam 64.

When the chair is moved to the TV position, it is necessary to prevent forward-rearward rocking of the chair to stabilize the chair in view of the fact that the footrest has been extended. In order to prevent forward-rearward rocking of the chair when in the TV and any advanced reclining positions beyond TV position, the chair is provided with a "rock-block" mechanism which in the preferred embodiment includes a "blocking pin" link 14 in the form of a bell crank having one arm pivoted at 82 to the forward end of the draw bar link 16. Note that pivot 82 also interconnects the upper end of rear footrest mounting link 10 as described above. Referring to FIG. 4, the opposite arm of blocking in link 14 has on its lower end, a blocking pin 100 which is adapted to enter into a keeper slot 101 to prevent forward-rearward rocking of the chair when it is moved into TV position, see FIG. 3. Keeper slot 101 is formed in a keeper link 11 which is pivotally mounted by pivot 103 to cam link 8 as best shown in FIG. 6. Keeper link 11 is actuated into a position to receive blocking pin 100 (when the chair is moved to TV position) by means of a "blocker-actuator" link 15 pivotally connected at its lower end by pivot 105 to the keeper link, see FIG. 5. The upper end of blocker-actuator link 15 is pivoted by pivot 104 to the bite of the blocking pin link 14 as best shown in FIG. 5. The forward end of keeper link 11 is pivotally connected to a constraining link 12 which is pivotally mounted to the base 50 of the chair by means of a bracket 13 fixed to the base 50 and pivotally connected to constraining link 12.

FIGS. 4, 5 and 6 illustrate the position of the rock-blocking mechanism when the linkage system and the chair are in the closed position of FIG. 1. FIG. 5 shows the rock-blocking mechanism in the position when the chair has been rocked forwardly and FIG. 6 illustrates the mechanism when the chair has been rocked rearwardly. FIG. 4 illustrates the mechanism when the chair is in a position intermediate those of FIGS. 5 and 6. In the aforementioned closed positions of the chair, the seat 7 and cams 8, 64 rock as a unit on the base 50, it being remembered that the seat linkage is retained in closed position against movement relative to the cam link 8 and cams 64 by means of the release mechanism 9, 22. Therefore, as the chair rocks forward and rearward, the rock blocking mechanism including links 11, 14 and 15 will swing back and forth by virtue of the connection of link 15 to the draw bar link 16 which rocks as a unit with the seat and cam structures. However, note that locking pin 100 does not enter slot 100 of keeper link 11 as long as the chair is in the closed position of FIG. 1. Note also that the forward-rearward rocking movement illustrated in FIGS. 4, 5 and 6 is constrained or limited by virtue of the constraining link 12 which is connected to keeper link 11 as described above.

When the chair is moved from closed position of FIG. 1 to TV position of FIG. 3 by means of handle 85 which opens the release links 9 and 22 as described above, the seat link 7 is inclined by rotating downwardly about pivot 7B to cam link 8, also as described above. This movement induces movement in the draw bar link 16 which in turn actuates links 14, 15 and 11 causing the locking pin 100 to enter the slot 101 of keeper link 11 to prevent rock movement of the cams 64 on the base, see FIG. 3.

In order to place the chair into advanced reclining position beyond the TV position shown in FIG. 3, the chair occupant merely exerts back pressure on the backrest 59 causing rear backrest mounting link 17 to pivot (counterclockwise in FIG. 7) downwardly about pivot 71 which causes the seat link 7 to rotate upwardly (counterclockwise in FIG. 7) about its pivotal connection 7B to cam link 8 whereby the seat rotates away (upwardly) from the cam link 8 into an advanced reclining position; the fully advanced or fully reclined position being shown in FIG. 7. It should be noted that when the chair moved into the TV position, the seat rotated downwardly (clockwise) about pivot 7B towards the cam link 8 whereas in moving to advanced reclining position, the seat rotated upwardly (counterclockwise) about pivot 7B away from the cam link 8. This unique action makes a highly compact linkage structure possible as it avoids translational movement between the seat and rocker cams while at the same time providing the various desired reclining positions of the chair.

Referring to FIG. 7, it will be noted that when the chair is placed into advanced reclining position, the rocker cams 64 are rocked rearwardly on base 50 to thereby permit the desired reclining position to be achieved. Referring to FIG. 7, this action is achieved through the counterclockwise (as viewed in FIG. 7) rotation of keeper link 11 about its pivotal mounting 103 to the cam link 8 which causes the cams 64 to rock rearwardly inasmuch as the forward end of keeper link 11 is constrained by constraining link 12. The aforementioned rotation of keeper link 11 is achieved through the draw bar link 16 which actuates link 14, which by virtue of the receipt of pin 100 in the slot of keeper link 11, becomes fixed relative to link 15 so that links 14 and 15 are one link in effect. This enables the force imparted to link 14 by draw bar link 16 to be transferred to the keeper link 11 through link 15 to thus allow keeper link to be actuated to raise the front end of the cam link 8 and its cam 64 resulting in rearward rocking of the cam 64. The chair is thus stabilized and balanced while in any advanced reclining position. In order to return to TV position from any advanced reclining position, the occupant need only remove pressure from the backrest causing a redistribution of his weight. A stop 108 may be provided on backrest mounting link 17 to engage the edge of the backrest link 21 when TV position is reached. The chair may then be returned to closed position by retracting the footrest with the legs as described above.

Although only the linkage system on one side of the chair has been shown and described above, it will be understood that another linkage system which is a mirror image of that described, will be provided on the other side of the chair.

What is claimed is:

1. A rocker-recliner chair comprising in combination, a support base, a rocker cam assembly mounted on the base, a seat and armrest fixed to each other as a unitary structure, a footrest, footrest linkage means mounting the footrest to the seat for movement between retracted and extended positions, seat linkage means mounting the seat to the rocker cam assembly for movement relative to the rocker cam assembly in response to the weight of a chair occupant, linkage means interconnecting the seat linkage and the footrest linkage for driving the footrest linkage to place the footrest into extended position as the seat moves relative to the rocker cam assembly, and a release means preventing the seat from moving relative to the rocker cam assembly when the footrest is retracted.

2. The chair defined in claim 1 wherein said seat linkage mounts the seat for rotational movement relative to the rocker cam assembly about an axis which is fixed relative to the seat and the rocker cam assembly.

3. The chair defined in claim 2 wherein said seat linkage includes a pivot at a front end portion of the seat about which the seat is rotatable relative to the rocker cam assembly.

4. The chair defined in claim 3 wherein said rocker cam assembly includes a rocker cam link fixed to cams, said seat linkage including a seat link fixed to the seat and wherein, said rocker cam link and said seat link are pivotally connected to each other at said pivot defined in claim 3.

5. The chair defined in claim 1 further including a handle mounted to the seat at one side of the chair for operating said release to place the chair into reclining position with the footrest extended.

6. The chair defined in claim 1 further including a rock-blocking means for preventing forward-rearward rocking of the chair once the footrest has been moved to extended position.

7. The chair defined in claim 6 further including a backrest, backrest linkage means mounting the backrest to the seat while being connected to the rocker cam assembly such that the backrest is retained against movement relative to the seat and rocker-cam assembly when the footrest is in retracted position but is freed to move relative to the seat and the rocker cam assembly once the footrest is extended to enable the seat to be placed into advanced reclining positions upon exertion of pressure on the backrest.

8. The chair defined in claim 7 further including means interconnecting the backrest linkage and the rock-blocking means for raising the front end of the rocker cam assembly when the backrest is moved relative to the seat to place the seat into advanced reclining position.

9. The chair defined in claim 6 wherein said rock-blocking means includes a constraining link pivotally connected to the base, a keeper link pivotally mounted intermediate its ends to the rocker cam assembly and being pivotally connected at one end portion to the constraining link, a pin link connected to the seat linkage and having a locking pin, said keeper link having a slot adopted to receive the locking pin, and a keeper actuating and control link pivotally connected to the pin link and the keeper link.

10. The chair defined in claim 8 wherein said rock-blocking means includes a constraining link pivotally connected to the base, a keeper link pivotally mounted intermediate its ends to the rocker cam assembly and being pivotally connected at one end portion to the constraining link, a pin link connected to the seat linkage and having a locking pin, said keeper link having a slot adopted to receive the locking pin, and a keeper actuating and control link pivotally connected to the pin link and the keeper link.

11. A rocker-recliner chair comprising in combination, a support base, a rocker cam assembly mounted on the base, a seat and armrest fixed to each other as a unitary structure, a footrest, footrest linkage means mounting the footrest to the seat for movement between a retracted and extended position, seat linkage means mounting the seat to the rocker cam assembly for rotation relative to the rocker cam assembly about an axis located at the front portion of the seat and which axis is fixed relative to the seat and the rocker cam assembly, and means for driving the footrest linkage to place the footrest into extended position as the seat rotates relative to the rocker cam assembly.

12. The chair defined in claim 11 wherein the seat rotates downwardly about said axis towards the rocker cam assembly when the footrest is extended, and wherein there is further included means for placing the seat into advanced reclined positions relative to the rocker cam assembly during which the seat rotates upwardly about said axis away from the rocker cam assembly.

13. A rocker recliner chair comprising a base, a rocker cam assembly mounted on the base for rocking movement relative thereto, a seat, linkage means mounting a seat relative to the rocker cam assembly, said linkage means including a seat link extending generally in a forward-rearward direction of the chair while being fixed to the seat and being mounted for rotation relative to the rocker cam assembly about an axis located at a front portion of the chair and which is fixed relative to the seat link and the rocker cam assembly, a backrest, backrest linkage mounting the backrest relative to the seat, linkage means mounting a portion of the backrest linkage relative to the rocker cam assembly at a rear portion of the seat thereby mounting the rear portion of the seat relative to the rocker cam assembly, footrest linkage means mounting the footrest to the seat for movement between a retracted positions extending below the front of the seat and an extended position projected forwardly from the front of the seat, means for driving the footrest between said retracted and extended positions thereof, a rock-blocking means preventing forward-rearward rocking movement of the rocking cam assembly relative to the base when the footrest is in said extended position, and linkage means interconnecting the rock-blocking means and said linkage which mounts part of said backrest linkage to the rocker cam assembly whereby said rock-blocking means is actuated to prevent forward-rearward rocking movement of the rocker cam assembly relative to the base when the footrest is extended.

14. A rocker-recliner chair comprising in combination, a base support, a rocker cam assembly mounted on the base support, a seat, linkage means mounting the seat to the rocker cam assembly, a footrest, a footrest linkage mounting the footrest to the seat for movement between extended and retracted positions, said footrest linkage including a footrest mounting link pivotally mounted to the seat for movement between extended and retracted positions, linkage means for actuating the footrest mounting link for purposes of extending the footrest, rock-blocking means for preventing forward-rearward rocking movement of the rocker cam assembly on the base support, said rock-blocking means including a constraining link pivotally mounted to the base support, a keeper link having a slot and being pivotally mounted to the rocker cam assembly and pivotally connected to the constraining link, a pin link having a pin adapted to be received in said slot of the keeper link when the footrest is moved to extended position to prevent forward-rearward rocking movement of the rocker cam assembly when the footrest is in extended position, said pin link being operatively connected to said linkage means which actuates the footrest mounting link, and a link interconnecting the pin link and the keeper link for actuating and controlling the keeper link.

15. A linkage system for a rocker-recliner chair of the type including a base, a rocker cam assembly mounted on the base, a seat mounted on the rocker cam assembly for movement with the rocker cam assembly during forward-rearward rocking movement relative to the base and also being movable relative to the rocker cam assembly placing the seat into reclining positions, a backrest mounted relative to the seat and the rocker cam assembly, for movement with the seat and also for movement relative to the seat, a footrest mounted to the seat for movement between a retracted position at the front of the seat and an extended position projected forwardly from the front of the seat; the linkage system comprising a seat link adapted to be fixed to an associated seat to extend generally in the forward-rearward direction of the associated chair, a cam link adapted to be mounted to an associated rocking cam, a seat link being mounted at a front end portion thereof relative to the cam link for rotation about an axis which is fixed relative to the seat and cam links, a backrest linkage adapted to mount the associated backrest relative to the seat link, the backrest linkage including a backrest link pivotally mounted to the seat link, and linkage mounting the backrest link relative to the cam link, a footrest linkage adapted to mount the associated footrest to the seat, the footrest linkage including a footrest mounting link pivotally mounted to the seat link, a draw bar link interconnecting the footrest mounting link and the linkage which mounts the backrest mounting link to the cam link, a rock-blocking linkage including a keeper link pivotally mounted to the cam link and having a slot therein, a constraining link pivotally connected to one end portion of said keeper link and adapted to be pivotally mounted to the associated base, a pin link having one end portion including a pin adapted to be received in said slot of said keeper link when the footrest linkage is extended, said pin link having an opposite end portion pivotally connected to said draw bar to be movable thereby, and an actuating and control link for the keeper link, said actuating and control link being pivoted at one end portion thereof to said pin link and being pivoted to an opposite end portion thereof to said keeper link.

16. The linkage system defined in claim 15 wherein said linkage which mounts said backrest mounting link relative to the cam link includes a first link pivotally mounted to said backrest mounting link and also being pivotally mounted to said cam link, and a second link having its opposite ends pivotally mounted to said first link and said cam link.

17. The linkage system defined in claim 16 wherein said draw bar link retains the seat against movement relative to the cam link when the footrest linkage is retracted and wherein there is included means for releasing the draw bar to permit the seat to be moved relative to the cam link about said fixed axis of rotation while the footrest linkage moves to extended position.

18. The linkage system defined in claim 17 wherein said means for releasing the draw bar link includes a handle mounted on one side of the seat link.

19. The linkage system defined in claim 18 wherein the seat link is moved relative to the cam link about said fixed axis of rotation and the footrest linkage is moved to extended position by the weight of an occupant of the associated chair when said handle is moved to release position.

20. A rocker-recliner chair comprising in combination, a support base, a rocker cam assembly mounted on the base, a seat and armrest fixed to each other as a unitary structure, a footrest, footrest linkage means mounting the footrest to the seat for movement between retracted and extended positions, seat linkage means mounting the seat to the rocker cam assembly for movement relative to the rocker cam assembly, linkage means interconnecting the seat linkage and the footrest linkage for driving the footrest linkage to place the footrest into extended position as the seat moves relative to the rocker cam assembly, means preventing the seat from moving relative to the rocker cam assembly when the footrest is retracted, and wherein said rocker cam assembly includes a rocker cam, and said seat linkage includes a seat link fixed to the seat and pivoted to a front end portion of the rocker cam for mounting the seat for rotation relative to the rocker cam about an axis which is fixed relative to the seat and the rocker cam.

* * * * *